US011546344B2

(12) United States Patent
Tomioka

(10) Patent No.: US 11,546,344 B2
(45) Date of Patent: Jan. 3, 2023

(54) BROWSING MANAGEMENT SERVER, BROWSING MANAGEMENT METHOD, AND BROWSING MANAGEMENT SYSTEM

(71) Applicant: CANON KABUSHIKI KAISHA, Tokyo (JP)

(72) Inventor: Yu Tomioka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 38 days.

(21) Appl. No.: 16/893,876

(22) Filed: Jun. 5, 2020

(65) Prior Publication Data

US 2020/0404004 A1 Dec. 24, 2020

(30) Foreign Application Priority Data

Jun. 20, 2019 (JP) .............................. JP2019-114447

(51) Int. Cl.
*H04L 9/40* (2022.01)
*G06F 16/955* (2019.01)
*H04L 67/02* (2022.01)
*G06F 16/957* (2019.01)

(52) U.S. Cl.
CPC .......... *H04L 63/108* (2013.01); *G06F 16/955* (2019.01); *G06F 16/9577* (2019.01); *H04L 63/0838* (2013.01); *H04L 63/102* (2013.01); *H04L 67/02* (2013.01)

(58) Field of Classification Search
CPC ... H04L 63/10; H04L 63/0838; G06F 16/955; G06F 16/954
See application file for complete search history.

(56) References Cited

U.S. PATENT DOCUMENTS

| 9,413,750 | B2* | 8/2016 | Akula | H04L 67/02 |
|---|---|---|---|---|
| 10,375,060 | B1* | 8/2019 | Graves | H04L 63/06 |
| 2006/0282678 | A1* | 12/2006 | Ali | G06F 21/34 |
| | | | | 713/185 |
| 2012/0210413 | A1* | 8/2012 | Akula | H04L 63/0815 |
| | | | | 726/8 |
| 2012/0260327 | A1* | 10/2012 | Lissick | H04L 63/0838 |
| | | | | 726/9 |
| 2013/0067541 | A1* | 3/2013 | Itoh | H04N 1/00854 |
| | | | | 726/4 |
| 2015/0341344 | A1* | 11/2015 | Dorfman | G06F 21/36 |
| | | | | 726/7 |
| 2018/0069972 | A1* | 3/2018 | Kawamoto | H04N 1/00973 |

FOREIGN PATENT DOCUMENTS

JP 2002-342225 11/2002

* cited by examiner

*Primary Examiner* — Esther B. Henderson
(74) *Attorney, Agent, or Firm* — Venable LLP

(57) ABSTRACT

An ID is managed, and access information including the ID is displayed on a first web browser. Thereafter, in response to reception of an access request by use of the access information from a second web browser, the predetermined web page is displayed on the second web browser, based on the ID included in the access request. Then, in response to completion of predetermined processing which is performed based on the predetermined web page, a first web page is displayed. In a case where display of a second web page, which is provided by a predetermined server, is requested by the user on the first web browser of the apparatus, the first web browser is controlled to perform a display for prompting an access to the predetermined server from another apparatus.

19 Claims, 11 Drawing Sheets

ACCESS URL
http://xxx.com/yyy/ABC123

| ACCESS ID | AUTHENTICATION URL |
|---|---|
| PQR567 | http://○○○.com/△△△ |
| ABC123 | http://○○○.com/△△△ |

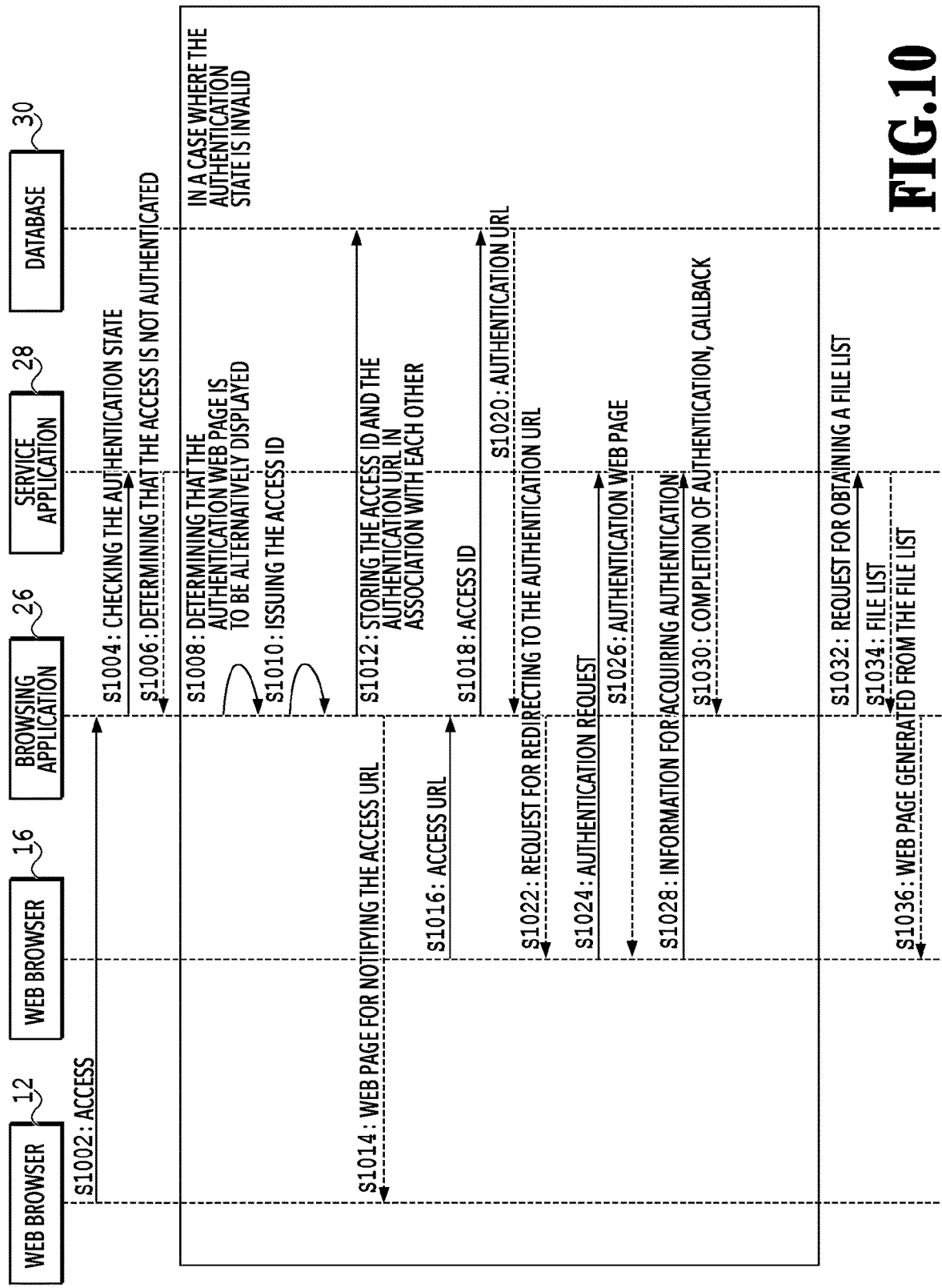

OBTAINING OF THE FILE HAS FAILED.

FIG.11A

PLEASE LOG IN TO THE COOPERATING
SERVICE FROM ANOTHER TERMINAL
AND CHECK THE STATE OF THE ACCOUNT.

FIG.11B

BROWSING MANAGEMENT SERVER, BROWSING MANAGEMENT METHOD, AND BROWSING MANAGEMENT SYSTEM

BACKGROUND OF THE INVENTION

Field of the Invention

The present invention relates to a browsing management server, a browsing management method, and a browsing management system for managing browsing of a web page by a user.

Description of the Related Art

In a case where a client terminal that can be used by a user, such as a printing apparatus, is connected to a network, it is possible for the user to utilize various services provided via the network. However, in such services, there are cases where a specific web page cannot be displayed, and such cases are caused by various reasons. Japanese Patent Laid-Open No. 2002-342225 discloses a technology for a case where contents cannot be displayed due to a frame of HTML being used. Furthermore, there may be a case in which a client terminal is mounted with a web browser that does not comply with a specific web page, and, therefore, it is not possible to browse the web page on the client terminal.

In such services as described above, in a case where a specific web page needs to be displayed during execution of given processing but the specific web page cannot be displayed, it is not possible to continue execution of the processing.

SUMMARY OF THE INVENTION

The present invention has been made in view of the above-described problems, and the present invention enables a user to browse a web page that cannot be browsed on a specific web browser.

In the first aspect of the present invention, there is provided a browsing management server for managing browsing of a web page by a user in accordance with an access from a first web browser of an apparatus, the browsing management server comprising:
 a management unit configured to manage an ID;
 a display unit configured to display access information including the ID managed by the management unit, on the first web browser;
 a reception unit configured to receive an access request from a second web browser, the access request being made by use of the access information; and
 a display control unit configured to cause the second web browser to display a predetermined web page, based on the ID which is included in the access request received by the reception unit and is managed by the management unit,
 wherein, in response to completion of predetermined processing which is performed based on the predetermined web page displayed on the second web browser by the display control unit, a first web page is displayed on the first web browser, and
 wherein, in a case where display of a second web page, which is provided by a predetermined server, is requested by the user on the first web browser of the apparatus, the first web browser is controlled to perform a display for prompting an access to the predetermined server from another apparatus.

In the second aspect of the present invention, there is provided a browsing management method for managing browsing of a web page by a user in accordance with an access from a first web browser of an apparatus, the browsing management method comprising:
 a step of managing an ID;
 a step of displaying access information including the ID managed by the management unit, on the first web browser;
 a step of receiving an access request from a second web browser, the access request being made by use of the access information; and
 a step of controlling causes the second web browser to display a predetermined web page, based on the ID which is included in the access request received in the step of receiving and is managed in the step of managing,
 wherein, in response to completion of predetermined processing which is performed based on the predetermined web page displayed on the second web browser in the step of controlling display, a first web page is displayed on the first web browser, and
 wherein, in a case where display of a second web page, which is provided by a predetermined server, is requested by the user on the first web browser of the apparatus, the first web browser is controlled to perform a display for prompting an access to the predetermined server from another apparatus.

In the third aspect of the present invention, there is provided a browsing management system including an apparatus provided with a first web browser and a browsing management server for managing browsing of a web page by a user in accordance with an access from the first web browser,
 the browsing management server comprising:
  a management unit configured to manage an ID;
  a display unit configured to display access information including the ID managed by the management unit, on the first web browser;
  a reception unit configured to receive an access request from a second web browser, the access request being made by use of the access information; and
  a display control unit configured to cause the second web browser to display a predetermined web page, based on the ID which is included in the access request received by the reception unit and is management unit,
 the apparatus comprising:
  a receiving unit configured to receive a predetermined notification in response to completion of predetermined processing performed on the predetermined web page displayed on the second web browser by the display control unit; and
  a display unit configured to display a first web page, based on reception of the predetermined notification by the receiving unit,
 wherein, in a case where display of a second web page, which is provided by a predetermined server, is requested by the user on the first web browser of the apparatus, the browsing management server further controls the first web browser to perform a display for prompting an access to the predetermined server from another apparatus.

According to the present invention, a user can browse a web page, which cannot be browsed on a specific web browser, on another web browser.

Further features of the present invention will become apparent from the following description of exemplary embodiments with reference to the attached drawings.

BRIEF DESCRIPTION OF THE DRAWINGS

FIG. 10 is a sequence diagram of the browsing processing, which illustrates a modification example in the case where an alternative display is performed; and FIGS. 11A and 11B are diagrams illustrating display examples in a case where an error occurs at the time of browsing a web page.

DESCRIPTION OF THE EMBODIMENTS

Hereinafter, with reference to the accompanying drawings, a detailed explanation is given of an example of the browsing management server, the browsing management method, and the browsing management system according to the present embodiment. In the present embodiment, an explanation is given with the example of a case in which a user logs in to a service server that provides a service via a first client terminal mounted with a first web browser, and a list of files managed in the service server is displayed on the web browser. Here, a case in which a web page for login to the service server cannot be browsed on the first web browser is taken as an example for the explanation.

<Configuration of the Browsing Management System>

Figure 1:
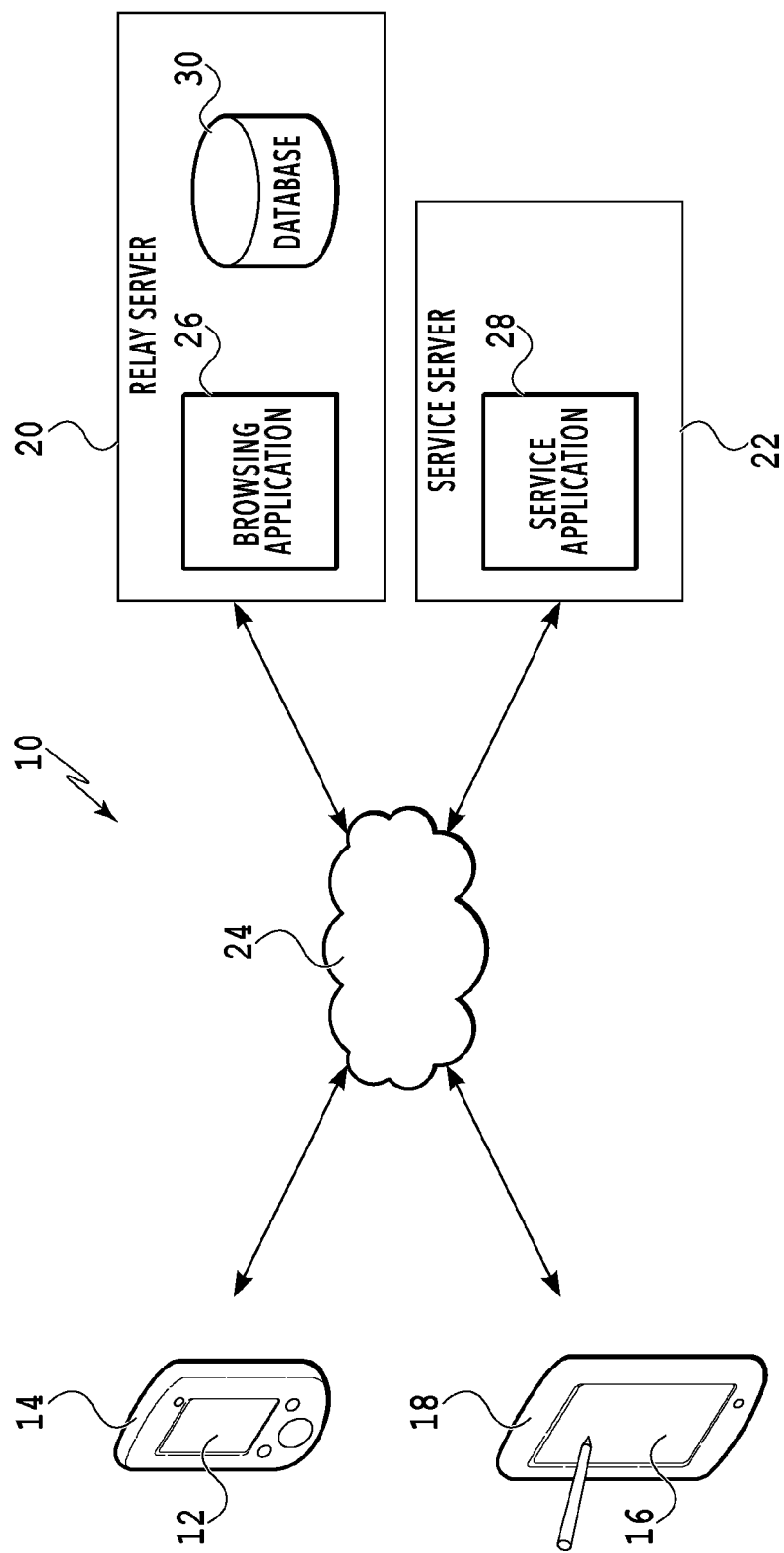
FIG. 1 is a schematic configuration diagram of a browsing management system according to the present embodiment.

FIG. 1 is a diagram illustrating the configuration of the browsing management system including the browsing management server according to the present embodiment. The browsing management system 10 of FIG. 1 includes a client terminal 14, which is mounted with a web browser 12, and a client terminal 18, which is mounted with a web browser 16. Furthermore, the browsing management system 10 includes a relay server 20 and a service server 22 connected to the client terminals 14 and 18 via a network 24.

For example, the network 24 may be a LAN (Local Area Network) for the Internet, etc., a WAN (Wide Area Network), a telephone line, or a dedicated digital line. Furthermore, ATM (Asynchronous Transfer Mode), a frame relay line, a cable television line, a wireless line for data broadcasting, and the like, may be used. Alternatively, what is termed as a communication network, which is realized by a combination of these, may be used.

The relay server 20 is a browsing management server that manages browsing of a web page by a user for utilizing a service provided by a service application 28 (to be described later) in response to access from the client terminals 14 and 18. That is, the relay server 20 controls display of a web page on the web browsers 12 and 16 according to access from the web browsers 12 and 16, so as to manage browsing of the web page by the user.

The relay server 20 is provided with a browsing management application 26 for managing browsing of a web page on the client terminals 14 and 18. Hereinafter, the "browsing management application" is referred to as a "browsing application". Note that, as described later, a web page is displayed by a web browser mounted on a client terminal such that a user can browse the web page. However, in the present specification, there is also a case in which it is simply described that a web page is displayed by a client terminal.

In the relay server 20, a function of managing browsing of a web page by a user on the web browsers 12 and 16 is implemented by the browsing application 26. The browsing application 26 sends a predetermined web page in response to access from the web browsers 12 and 16. As the predetermined web page, web pages related to various services provided by a service server are included. That is, in the present embodiment, the client terminals do not obtain web pages related to various kinds of information provided by the service server 22 directly from the service server 22 and display the web pages. Instead, the client terminals obtain web pages via the browsing application 26 and display the web pages. In other words, by displaying a web page provided from the browsing application 26, the client terminals indirectly allow the user to browse various kinds of information provided by the service server 22. For example, regarding information of a list of files managed by the service server 22, the client terminals display a web page provided from the browsing application 26, so as to allow the user to browse the information. Note that, as the predetermined web page, a service login page for login to the service server 22 from a client terminal is included. Note that the service login page is a web page provided from the service server 22. Furthermore, as the predetermined web page, a web page for notifying an access URL, which is described later, may be included. In addition, the relay server 20 is provided with a database 30. For example, the database 30 is used for the browsing application 26 to manage an access ID (to be described later).

Each of the web browser 12 (first web browser) and the web browser 16 (second web browser) is an application for displaying a web page. In the present embodiment, the web browsers 12 and 16 display web pages sent from the browsing application 26. Furthermore, the web browsers 12 and 16 display a service login page provided by the service application 28, which is installed in the service server 22, and sent from the browsing application 26. Note that, in the present embodiment, an explanation is given of processing in a case where the service login page cannot be displayed. Details are described later. Furthermore, the web browsers 12 and 16 receive an operation provided by a user on a client terminal. In the present embodiment, a web page sent from the browsing application 26 is a structured document described in HTML, XHTML, or the like, including JavaScript (registered trademark). Furthermore, the web browsers 12 and 16 interpret such a structured document and display a result of interpretation. To display a web page by the web browsers 12 and 16 includes to display an execution result and a processing result of JavaScript.

The service server 22 provides a predetermined service to the client terminals 14 and 18 via the relay server 20. In the service server 22, the application 28 for providing a predetermined service to the client terminals 14 and 18 is installed. Hereinafter, the "application for providing a predetermined service" is referred to as the "service application". On the client terminals 14 and 18, a service provided by the service application 28 via the relay server 20 is utilized. In the present embodiment, for example, the service application 28 manages data such as image data and document files owned by a user on the service server 22 and provides a service that makes it possible to browse such files on a web browser. Furthermore, the service application 28 provides a service of providing file information via an API (Application Programming Interface).

Note that the service provided by the service application 28 is not limited as such, and various publicly-known services may be provided. For utilizing the service application 28, login with preregistered account information is necessary. In the present embodiment, login means to input and authenticate account information in general and to obtain authentication information.

In the present embodiment, the browsing application 26 installed in the relay server 20 sends a web page to the client terminals 14 and 18 to display the web page on the client terminals. Thereby, it is possible for a user to browse a web page displayed on a client terminal. Furthermore, the browsing application 26 can perform a process for login to the service application 28 in response to an operation provided by a user through a web page displayed on the client terminal 14 or 18. Furthermore, after the login process, by use of the authentication information, the browsing application 26 obtains information related to a service provided by the service application 28, so as to generate a web page on which the service can be utilized and send the web page to the web browser 12 or 16. As described above, in the browsing management system 10, communication is performed between the relay server 20, in which the browsing application 26 is installed, and the service server 22, in which the service application 28 is installed, and the results thereof are sent to the web browsers 12 and 16.

The client terminals 14 and 18 may be any terminals, such as a smartphone, a tablet, and a general-purpose personal computer, as long as a web browser can be mounted on the terminals. For example, the client terminal 14 may be a printer that prints an image on a print medium such as printing paper or a scanner that reads a document. In this case, a printer or a scanner is included in the configuration diagram of the client terminal 14, which is described later with reference to FIG. 3. Alternatively, the client terminal 14 may be an MFP (Multi-Function Printer) including both a printer and a scanner. In this case, for example, the web service provided by the relay server 20 or the service server 22 is a cloud print, in which an image stored in the service server 22 is printed by a printer of the client terminal 14. Alternatively, the web service may be a cloud scan, in which an image obtained by reading a document by a scanner included in the client terminal 14 is uploaded to the service server 22.

Note that the capacity of the memory (RAM) mounted on the client terminal 18 is larger than that of the client terminal 14. The client terminal 14 is not capable of displaying a predetermined web page since, for example, the web browser 12 does not comply with the standard of the predetermined web page which is provided by the service application 28. Alternatively, it may be assumed that the predetermined web page cannot be displayed because the capacity of the memory is small. Furthermore, it is assumed that the client terminal 18 is capable of displaying the predetermined web page by use of the web browser 16. In the present embodiment, the predetermined web page is an authentication web page (authentication screen), which is for acquiring authentication for access to the service server 22, that is, the service login page as described above.

<Hardware Configuration of the Relay Server>

Figure 2:
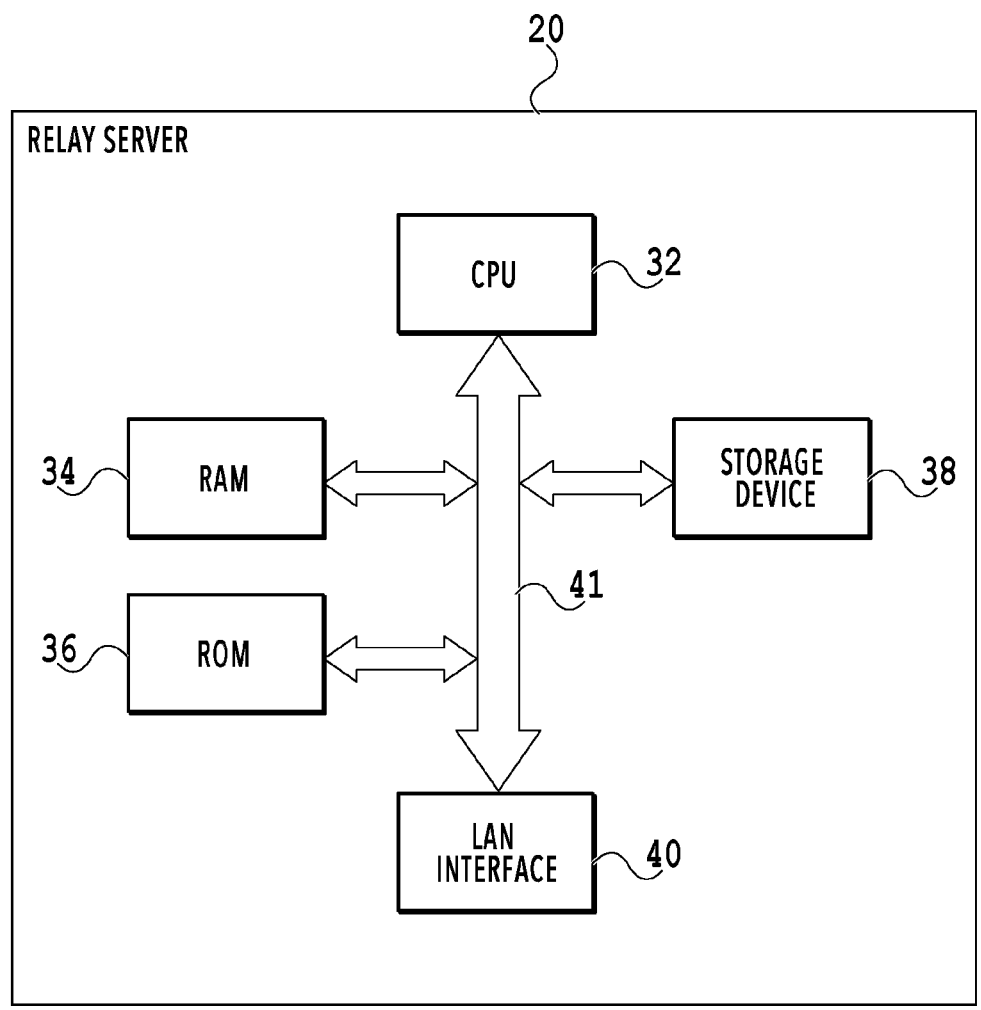
FIG. 2 is a block diagram illustrating the hardware configuration of a relay server.

Next, an explanation is given of the hardware configuration of the relay server 20. FIG. 2 is a diagram illustrating the hardware configuration of the relay server 20. In the relay server 20, a central processing unit (CPU) 32, a RAM 34, a ROM 36, a storage device 38, and a LAN interface 40 are connected via a bus 41. The CPU 32 performs calculations, determinations, controls, and the like, according to programs and various parameters stored in the ROM 36 while using the RAM 34 as a work area. For example, a hard disk drive (HDD) or a flash memory can be used as the storage device 38, and the storage device 38 stores various kinds of data such as an OS (Operating System) and applications. The LAN interface 40 is an interface to which a LAN cable is connected, and the LAN interface 40 is used for data communication with the client terminals 14 and 18 and the service server 22 via a router (not illustrated in the drawings) and the network 24. Note that, for example, such data communication may be performed wirelessly by use of an interface complying with wireless communication.

<Hardware Configuration of Client Terminals>

Figure 3:
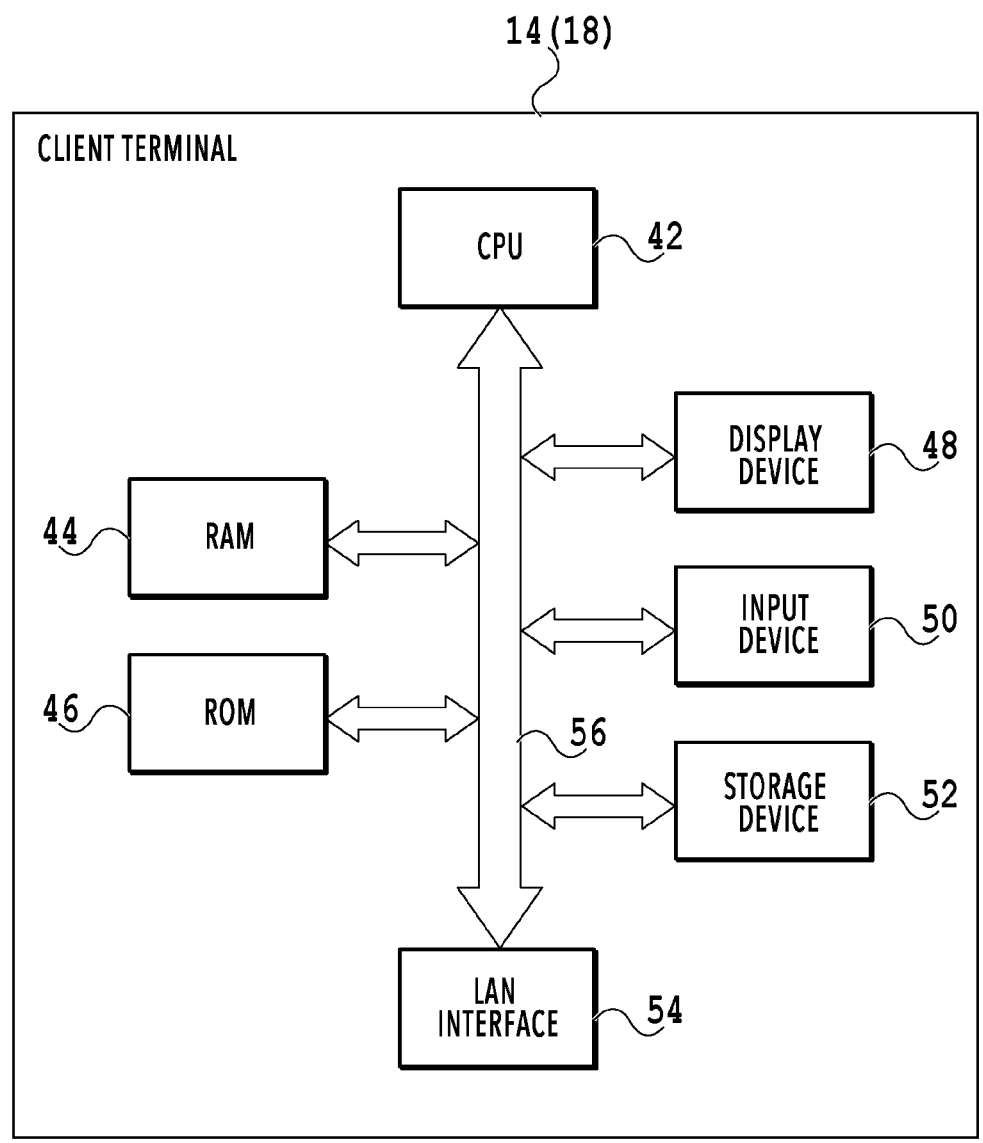
FIG. 3 is a block diagram illustrating the hardware configuration of a client terminal.

Next, an explanation is given of the hardware configuration of the client terminals 14 and 18. FIG. 3 is a diagram illustrating the hardware configuration of the client terminals 14 and 18. Note that, since the configurations of the client terminal 14 and the client terminal 18 are the same, the hardware configuration of the client terminal 14 is explained below, and an explanation of the client terminal 18 is omitted.

In the client terminal 14, a CPU 42, a RAM 44, a ROM 46, a display device 48, an input device 50, a storage device 52, and a LAN interface 54 are connected via a bus 56. The CPU 42 performs calculations, determinations, controls, and the like, according to programs and various parameters stored in the ROM 46 while using the RAM 44 as a work area. The ROM 46 stores an OS, a web browser, and other applications together with programs for various kinds of processing.

The display device 48 includes a liquid crystal display and a graphic controller and displays a web page downloaded from a server, a graphical user interface (GUI), and the like. For displaying a web page, a web page sent from a server is downloaded by the web browser 12 to the RAM 44 and is displayed on the display device 48. The input device 50 is a device such as a keyboard, which is operated by a user for providing various kinds of instructions to the client terminal 14. The client terminal 14 performs processing according to an instruction input by a user via the input device 50. Although the display device 48 and the input device 50 are separately configured in the present embodiment, the present embodiment is not limited as such, and it is possible that there is provided a touch panel display in which a display device and an input device are integrated.

Since the LAN interface 54 has the same configuration as the LAN interface 40 described above, an explanation thereof is omitted. For example, an HDD or a flash memory may be used as the storage device 52. In a case where the client terminal 14 is a smartphone, a flash memory is used as the storage device 52.

<Functional Configuration of the Relay Server>

Figure 4:
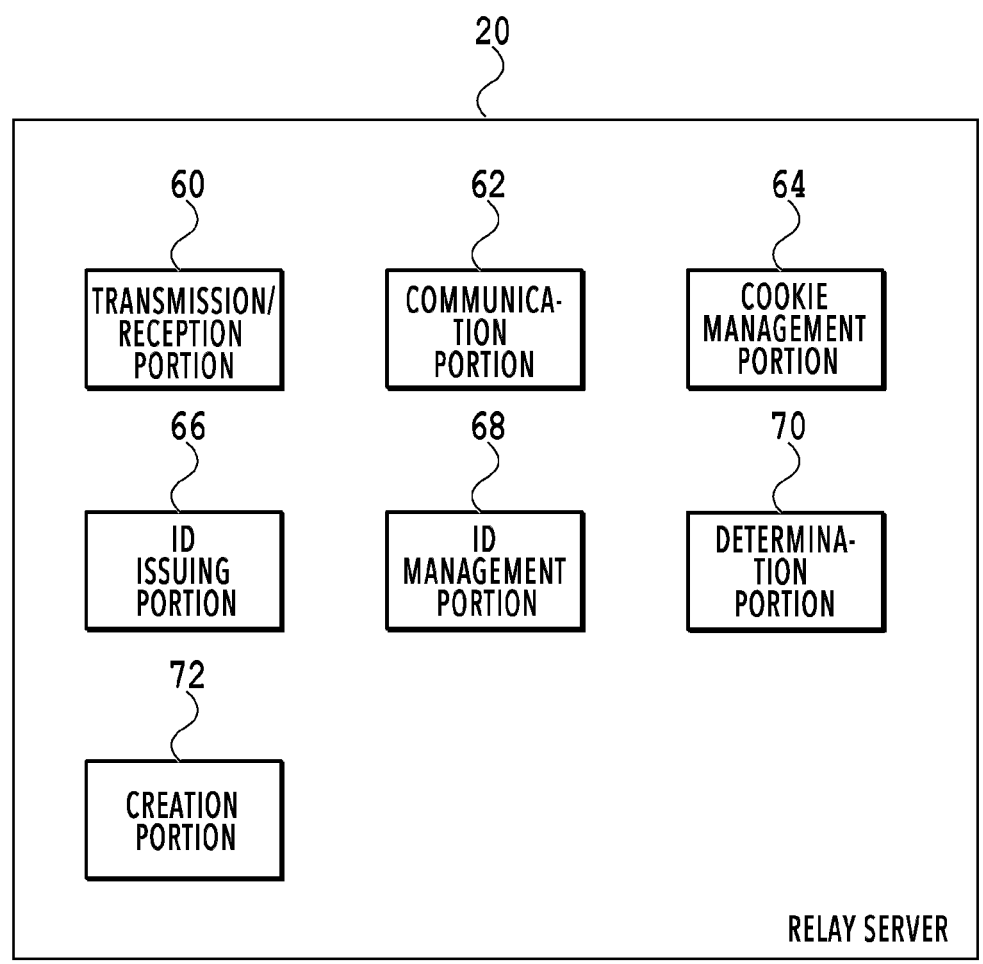
FIG. 4 is a block diagram illustrating the functional configuration provided by a browsing application of the relay server.

Next, an explanation is given of the functional configuration of the relay server 20, which is implemented by activation of the browsing application 26. FIG. 4 is an explanatory diagram illustrating the functional configuration of the relay server 20 at the time where the browsing application 26 is activated. The relay server 20 is provided with the following functional configuration because of the browsing application 26.

The relay server 20 includes a transmission/reception portion 60 that generates a web page to be sent to the web browsers 12 and 16 and that sends and receives various kinds of information including a web page to and from the web browsers 12 and 16. Furthermore, the relay server 20 includes a communication portion 62 that communicates with the service server 22 and includes a cookie management portion 64 that writes, reads, and deletes cookies regarding the web browsers 12 and 16. Note that the cookie management portion 64 encodes and decodes a value in a case of writing and reading a cookie. Furthermore, the relay server 20 includes an ID issuing portion 66 that issues an access ID (to be described later) and an ID management portion 68 that manages the issued access ID by use of the database 30.

The relay server 20 determines whether a predetermined web page provided by the service application 28 can be displayed on a currently-accessing web browser 12 or not and, based on the determination, the relay server 20 determines whether to perform an alternative display on another web browser or not. That is, in a case where it is determined that the predetermined web page can be displayed on the web browser 12, the determination portion 70 determines that an alternative display on another web browser is not to be performed. Contrarily, in a case where it is determined that the predetermined web page cannot be displayed on the web browser 12, it will be determined that an alternative display on another web browser is to be performed. Furthermore, the relay server 20 includes a creation portion 72 that creates an access URL (to be described later) by use of an access ID.

<Flow of Browsing Processing>

Figure 5:
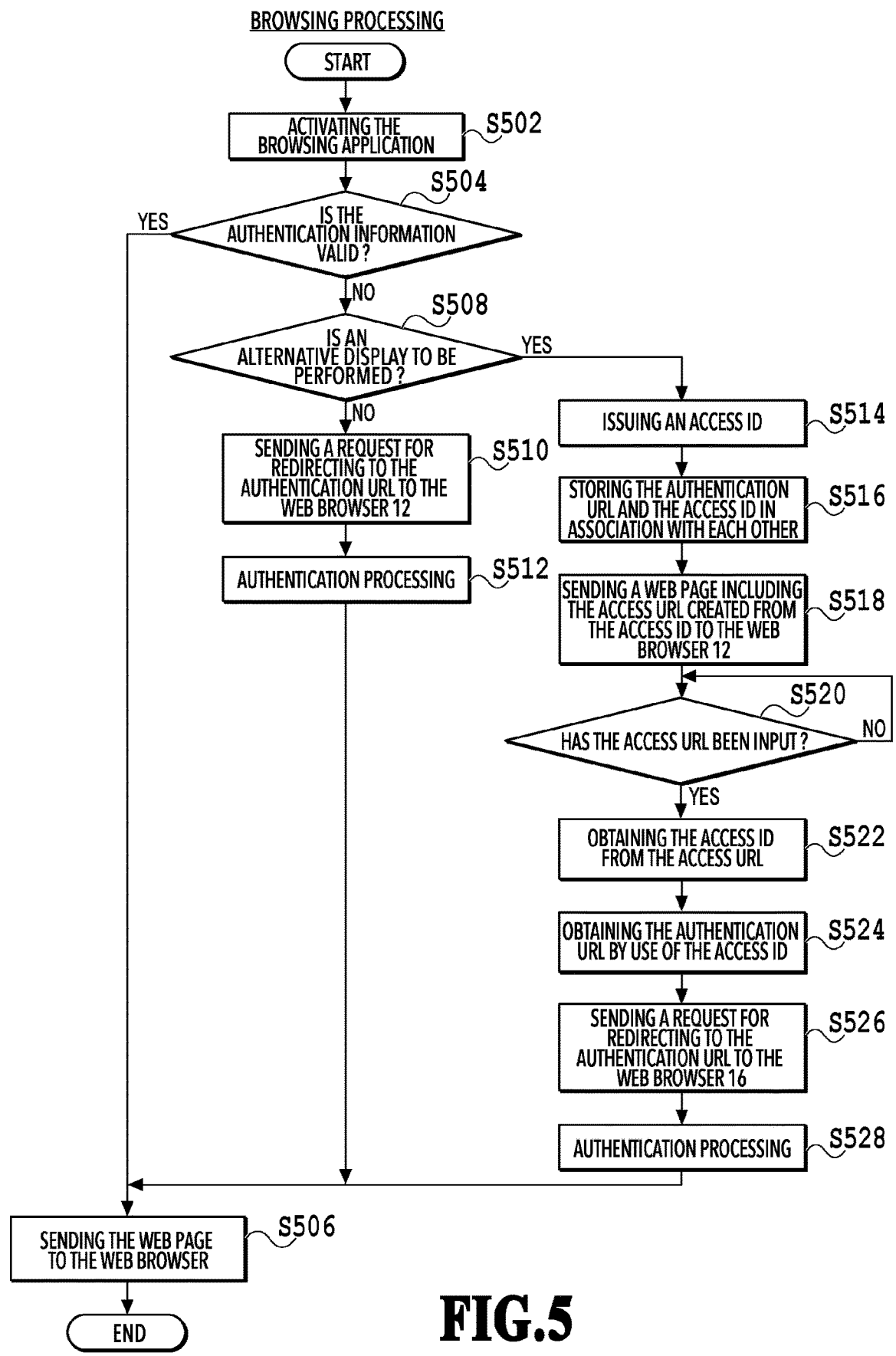
FIG. 5 is a flowchart illustrating details of browsing processing.

Based on the above configurations, an explanation is given of the case in which the client terminal 14 accesses the service server 22 via the relay server 20 in the browsing management system 10. In the present embodiment, the case of utilizing the service application 28, which is an application for managing files, is taken as an example for the explanation. FIG. 5 is a flowchart illustrating details of browsing processing for displaying a web page on which the file management service provided by the service application 28 can be utilized, so that browsing of the web page becomes possible. The present browsing processing is performed by the relay server 20. Note that, by utilizing the web page of which browsing has become possible because of the browsing processing, the user utilizes the file management service provided by the service application 28.

In a case where the user operates the client terminal 14 to provide an instruction to the web browser 12 for starting utilizing the file management service provided by the service application 28, the browsing processing is started in the browsing management system 10. In the present browsing processing, first, an access signal for accessing the service server 22 is sent to the relay server 20. The relay server 20 activates the browsing application 26 in response to reception of this access signal (S502). Note that, in a case where the browsing application 26 has already been activated, this step is omitted.

Next, the relay server 20 accesses the service server 22 and checks the authentication state of access from the client terminal 14 to the service server 22 (S504). That is, in S504, the browsing application 26 determines whether the authentication information for authenticating the access from the client terminal 14 to the service server 22 is valid or not, by use of session information between the client terminal 14 and the relay server 20. In S504, for example, in a case where the valid period of the previous authentication information has expired or in a case where the client terminal 14 accesses the service server 22 for the first time, that is, in a case where authentication information does not exist, etc., it will be determined that the authentication information is invalid. Note that the determination method is not limited as such. That is, any method may be used as long as it is possible to determine whether the authentication performed at the time of the previous access from the client terminal 14 is valid or not, such as by using cookie information stored in the client terminal 14.

In a case where the authentication information is valid, the relay server 20 sends a web page for utilizing the file management service provided by the service application 28 to the web browser 12 by use of the valid authentication information (S506). Then, the present browsing processing ends. That is, in S506, the communication portion 62 accesses the service server 22 and obtains information related to the file management service by use of the authentication information. Next, the transmission/reception portion 60 generates the web page (file display screen) for utilizing the file management service, based on the obtained information related to the file management service, and sends the generated web page to the web browser 12. Accordingly, a web page (first web page) on which the file management service can be utilized is displayed on the web browser 12, so that the user can browse the web page. Thereafter, the user utilizes the file management service by use of the web page provided by the service server 22 (predetermined server).

On the other hand, in a case where the authentication information is invalid, it is necessary to display an authentication web page provided by the service application 28 and execute authentication processing, in order to authenticate access from the client terminal 14. Here, since the authentication processing is for authenticating access from the client terminal 14, the authentication web page is usually displayed on the web browser 12 mounted on the client terminal 14. However, in a case where the web browser 12 does not satisfy the standard for displaying the authentication web page or in a case where the capacity of the RAM 44 mounted on the client terminal 14 is small, the authentication web page cannot be normally displayed on the web browser 12.

Therefore, in the present embodiment, in a case of displaying the authentication web page, the determination portion 70 in the relay server 20 determines whether to alternatively display the authentication web page on another web browser or not (S508). Note that, in the present embodiment, since the browsing management system 10 only includes the client terminal 18 in addition to the client terminal 14, whether to perform an alternatively display on the web browser 16 of the client terminal 18 or not is determined in S508 in practice. For example, as the determination method in S508, a list of version information of web browsers or types of client terminals, etc., that cannot display the authentication web page is stored in the browsing application 26 in advance. Then, the determination is made by use of information of the web browser or client terminal, such as User Agent, which is included in the access signal that is output from the web browser 12 at the time of activating the browsing application 26. Alternatively, information for the determination may be sent from the web browser 12 to the browsing application 26. Therefore, in a case where the information of the web browser or client terminal or the information for the determination is not present in the list, it will be determined that the authentication web page can be displayed on the web browser 12 and that an alternative display on another web browser is not to be performed. Furthermore, in a case where the information of the web browser or client terminal or the information for the determination is present in the list, it will be determined that the authentication web page cannot be displayed on the web browser 12 and that an alternative display on the web browser 16 is to be performed.

Note that the determination method in S508 is not limited to the method described above. For example, it is also possible to provide such setting that authentication web page in a case of access from the web browser 12 is to be displayed on the web browser 16, so that whether to perform an alternative display or not is determined based on the setting. Moreover, instead of storing a condition for determination in advance, it is also possible that the determination is made by a determination device that determines whether the authentication web page is normally displayed on the web browser 12 or not, so that, in a case where it is determined that the authentication web page is not normally displayed, it will be determined that an alternative display on another web browser is to be performed.

In a case where it is determined that the authentication web page is not to be alternatively displayed in S508, the transmission/reception portion 60 sends a request for redirecting to the URL for accessing the authentication web page to the web browser 12 (S510). In the following explanation, a "URL (Uniform Resource Locator) for accessing an authentication web page" is referred to as an "authentication URL". Thereafter, the authentication web page is displayed on the web browser 12, and the authentication processing is performed based on information that is input by the user on the authentication web page (S512), then the processing proceeds to S506 upon authentication. Note that, in a case where the authentication is not successfully done, the browsing processing ends after the transmission/reception portion 60 sends a notification indicating that the authentication was not successfully done to the web browser 12, so as to notify the client terminal 14 that the authentication was not successfully done, for example.

In a case where it is determined that the authentication web page is to be alternatively displayed in S508, the ID issuing portion 66 issues an access ID (S514). Then, the ID management portion 68 associates the issued access ID and the authentication URL (information related to a predetermined web page) with each other, and the ID management portion 68 stores the issued access ID and the authentication URL in the database 30 (S516). The access ID is an ID used by the browsing application 26 to obtain the authentication URL in a case where the web browser 16 accesses the relay server 20, based on the later-described access URL.

Next, by use of the access ID, the creation portion 72 creates a URL to be used for accessing the relay server 20 from another web browser, that is, the web browser 16, and the transmission/reception portion 60 sends the created URL to the web browser 12 (S518). In the following explanation, a "URL created by use of an access ID and used for accessing the browsing application 26 from the web browser 16" is referred to as an "access URL". In S518, specifically, the transmission/reception portion 60 generates a web page for displaying the access URL (access information) and sends the created web page to the web browser 12. As a result, the access URL is displayed on the web browser 12, so that the user can browse the access URL. For example, on the web page that displays the access URL, a notification that prompts to input the access URL from another client terminal or another web browser is performed. The method of such a notification is not limited as such, and the notification may be displayed on the web page or may be played as audio guidance. In the present embodiment, the creation portion 72 and the transmission/reception portion 60 function as a display unit that displays the access URL on the web browser 12.

Thereafter, whether the access URL has been input by the user or not is determined (S520). That is, in a case where the access URL is displayed on the web browser 12 by the processing in S518, the user will input the access URL to another web browser, that is, the web browser 16. Therefore, in S520, the transmission/reception portion 60 determines whether the access URL has been input from another web browser (the web browser 16 in the present embodiment) or not. That is, the transmission/reception portion 60 determines whether there is an access request with designation of the access ID as a parameter or not. As described above, in the present embodiment, the transmission/reception portion 60 functions as a reception unit for receiving an access URL from the web browser 16.

In a case where it is determined in S520 that the access URL has been input, the transmission/reception portion 60 obtains the access ID from the access URL that has been input (S522). That is, as described above, since the access URL is created from the access ID, it is possible for the transmission/reception portion 60 to obtain the access ID from the access URL that has been used for the access. Next, based on the obtained access ID, the transmission/reception portion 60 obtains the authentication URL, which is managed by the ID management portion 68 and associated with the access ID by the processing in S516 (S524). Then, the transmission/reception portion 60 sends a request for redirecting to the authentication URL to the web browser 16 (S526). Thereafter, based on information that is input to the authentication web page displayed on the web browser 16, the authentication processing is performed (S528), and, upon authentication, the processing proceeds to S506. Note that, in a case where the authentication is not successfully done, the browsing processing ends after the transmission/reception portion 60 sends a notification indicating that the authentication was not successfully done to the web browser 12, so as to notify the client terminal 14 that the authentication was not successfully done, for example. In the present embodiment, the transmission/reception portion 60 obtains the authentication URL from the access ID and sends the request for redirecting to the authentication URL to the web browser 16, so that the transmission/reception portion 60 functions as a notification unit for notifying a user of the authentication URL via the web browser 16.

<Sequence of the Browsing Processing>

Figure 6:
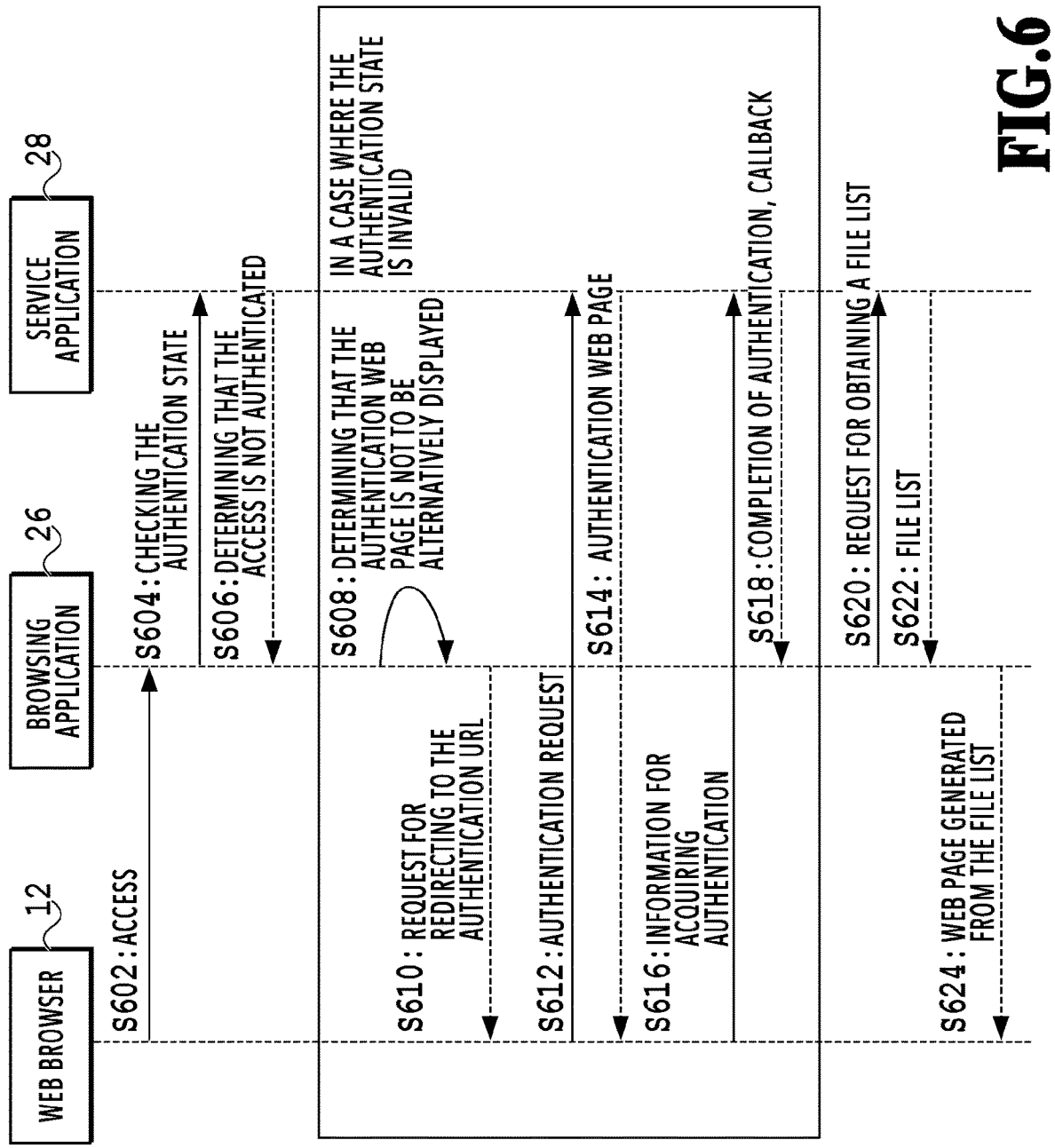
FIG. 6 is a sequence diagram of the browsing processing in a case where an alternative display is not performed.

Next, an explanation is given of processing of accessing the service server 22 from the web browser 12 via the relay server 20 to make it possible to browse a web page for utilizing a service, which is provided by the service application 28, on the web browser 12. First, with reference to FIG. 6, an explanation is given of the case in which it is determined that the authentication web page is not to be alternatively displayed on another web browser in S508. FIG. 6 is a sequence diagram of browsing processing in the case where it is determined that the authentication web page is not to be alternatively displayed on another web browser.

The web browser 12 of the client terminal 14 accesses the browsing application 26 (S602), so that the browsing application 26 is activated (corresponding to S502 as described above). Next, the browsing application 26 checks the stored authentication state with the service application 28 (S604), so that the service application 28 determines whether the access from the client terminal 14 is authenticated or not (corresponding to S504 as described above).

In a case where it is determined that the access from the client terminal 14 is not authenticated (S606), the browsing application 26 determines whether the authentication web page provided by the service application 28 is to be alternatively displayed on another web browser or not (corresponding to S508 as described above). In the present determination, in a case where it is determined that an alternative display is not to be performed (S608), the browsing application 26 sends the request for redirecting to the authentication URL to the web browser 12 (S610, which corresponds to S510 as described above).

The web browser 12 sends an authentication request to the service application 28 in accordance with the received redirect request (S612). That is, in S612, the web browser 12 accesses the authentication URL. As a result, the authentication web page is sent from the service application 28 to the web browser 12, and the authentication web page is displayed on the web browser 12 (S614). Thereafter, in a case where the user inputs information (such as an account ID and a password) for acquiring authentication for utilization of the service application 28 on the authentication web page, the web browser 12 sends the input information to the service application 28 (S616). In a case where the authentication is successfully done in the service application 28 based on the input information, the service application 28 sends a callback after completion of authentication to the browsing application 26 (S618). The processing from S612 to S618 corresponds to the authentication processing in S512 as described above.

Figure 7:
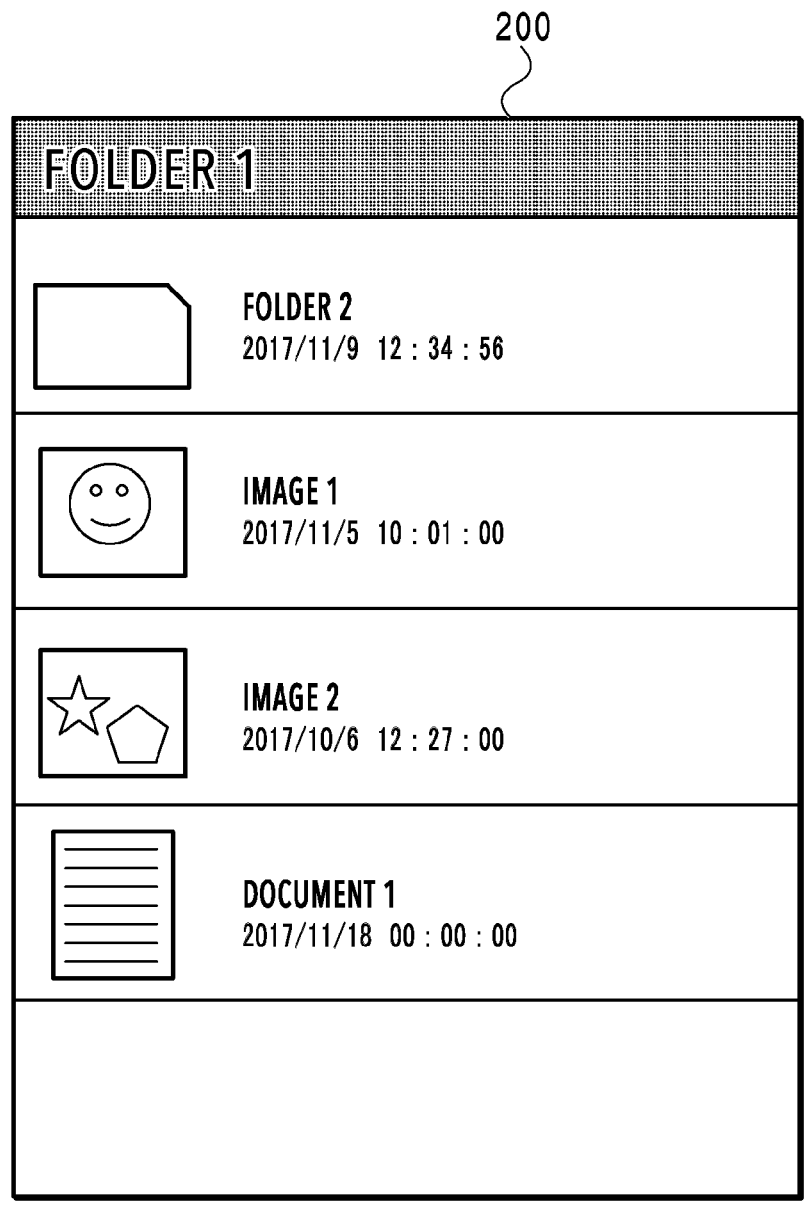
FIG. 7 is a diagram illustrating an example of a file display screen.

In a case where the authentication is successfully done, the browsing application 26 can access the files managed by the service application 28. Furthermore, the browsing application 26 sends a request for obtaining a file list associated with the authenticated account to the service application 28 (S620). Thereafter, in response to this obtaining request, the service application 28 sends the file list to the browsing application 26 (S622). Then, based on the received file list, the browsing application 26 generates a file display screen 200 (see FIG. 7) as the web page for utilizing the file management service, and the browsing application 26 sends the generated web page to the web browser 12 (S624). Note that FIG. 7 is a diagram illustrating an example of the web page on which a list of files managed by the service application 28 is displayed. In this way, the web page for utilizing the file management service is displayed on the web browser 12. The processing from S620 to S624 corresponds to the processing of S506 as described above.

Note that, in a case where it is determined that the access from the client terminal 14 is authenticated in S606 in response to the check of the authentication state in S604, the processing from S608 to S618 is omitted, and the processing from S620 is executed.

Figure 8:
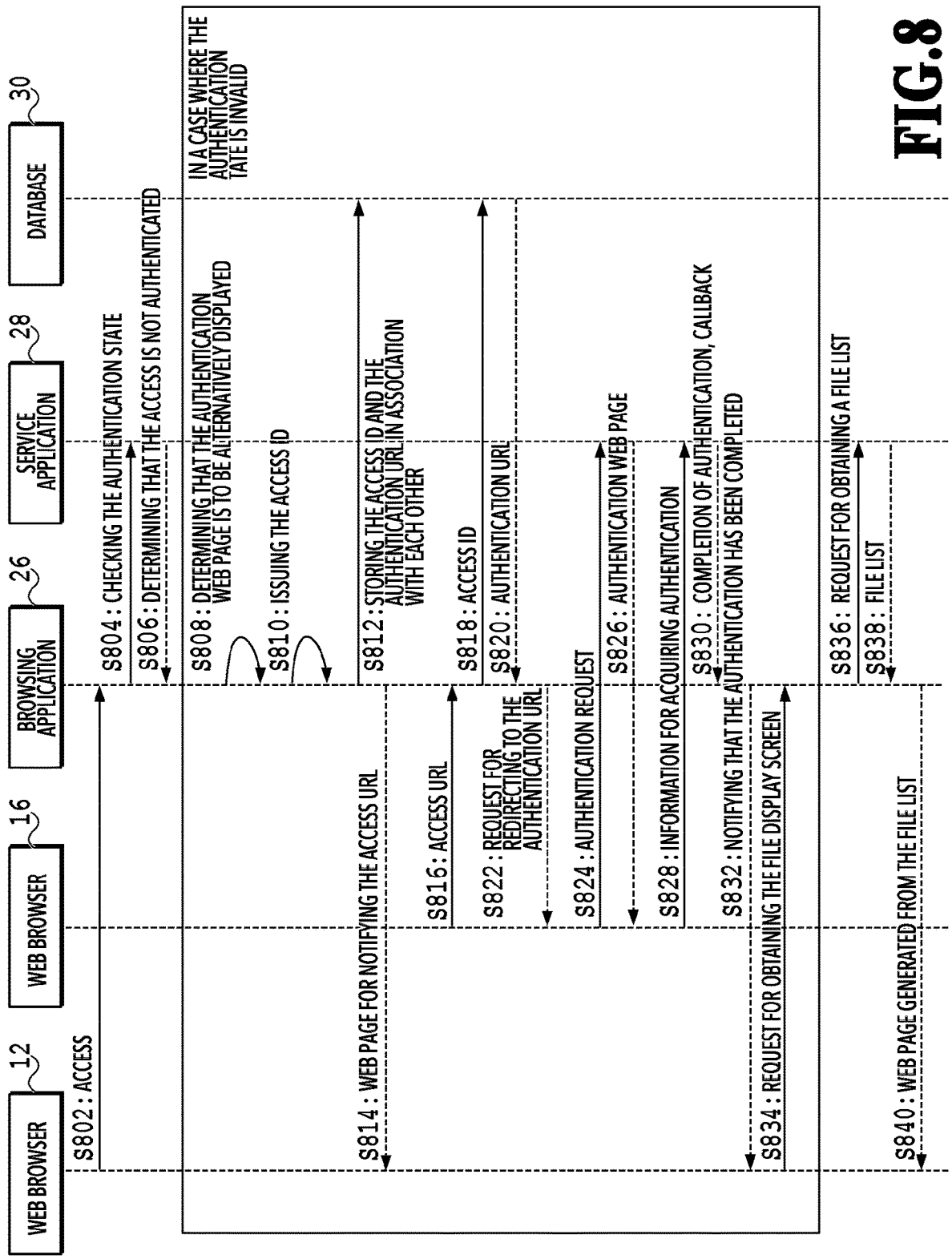
FIG. 8 is a sequence diagram of the browsing processing in a case where an alternative display is performed.

Next, with reference to FIG. 8, an explanation is given of the case in which it is determined in S508 that an alternative display on another web browser is to be performed. FIG. 8 is a sequence diagram of browsing processing in the case where it is determined that the authentication web page is to be alternatively displayed on another web browser.

The web browser 12 of the client terminal 14 accesses the browsing application 26 (S802), so that the browsing application 26 is activated (corresponding to S502 as described above). Next, the browsing application 26 checks the stored authentication state with the service application 28 (S804), so that the service application 28 determines whether the access from the client terminal 14 is authenticated or not (corresponding to S504 as described above).

In a case where it is determined that the access from the client terminal 14 is not authenticated (S806), the browsing application 26 determines whether the authentication web page provided by the service application 28 is to be alternatively displayed on another web browser or not (corresponding to S508 as described above). In the present determination, in a case where it is determined that an alternative display is not to be performed (S808), the browsing application 26 issues the access ID (S810, which corresponds to S514 as described above). Next, the browsing application 26 associates the issued access ID and the authentication URL with each other and stores the issued access ID and the authentication URL in the database 30 (S812, which corresponds to S516 as described above). Furthermore, the browsing application 26 creates the access URL by use of the issued access ID, generates the web page (notification screen) for notifying the access URL, and sends the web page to the web browser 12 (S814, which corresponds to S518 as described above). As a result, the web browser 12 displays the notification screen 100 for notifying the access URL.

Figures 9A, 9B, 9C:
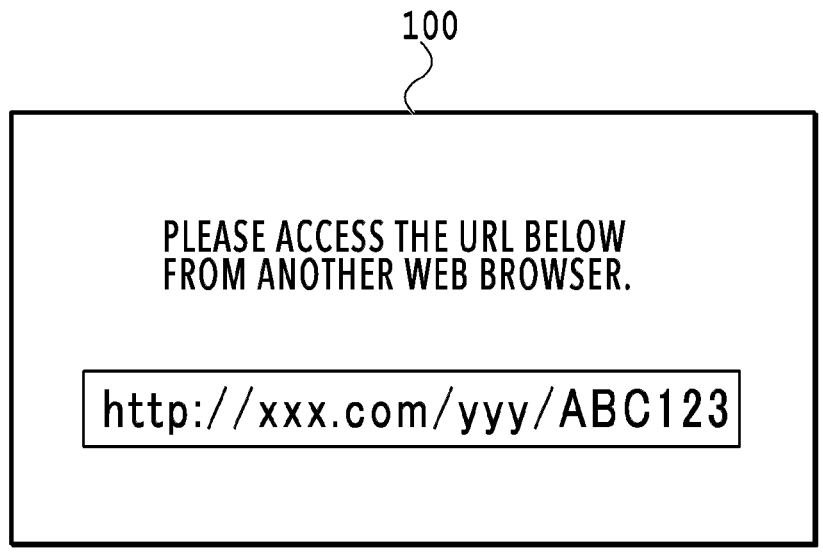
FIGS. 9A, 9B, and 9C are diagrams illustrating an access URL including an access ID and an authentication URL as well as display examples thereof.

FIG. 9A is a diagram illustrating an access URL created in association with an access ID, and FIG. 9B is a diagram illustrating information in a database, in which an access ID and an authentication URL are stored in association with each other. FIG. 9C is a diagram illustrating an example of the notification screen 100 displayed on the web browser 12. In the present embodiment, as illustrated in FIG. 9A, the last six digits of the access URL are "ABC123", which is the access ID. The domain part of the access URL indicates the relay server 20 (the browsing application 26). The access ID part of the access URL is handled as a kind of parameter in the browsing application 26. Furthermore, in the database 30, an access ID and an authentication URL are stored in association with each other, as illustrated in FIG. 9B. Moreover, on the notification screen 100, a comment for prompting to access the access URL using another web browser is notified together with the access URL, as illustrated in FIG. 9C.

Note that the access ID may have any format as long as it is guaranteed that the access ID is a unique ID. Furthermore, from the viewpoint of security, etc., a valid period may be set for the access ID, or the access ID may be set as a one-time ID that can be used only once. Moreover, on the notification screen 100, information (including the access ID) for the user to access the browsing application 26 from the web browser 16 is displayed at least. Note that the information for accessing is not limited to a form that can be confirmed by the user as a URL format, and various publicly-known technologies may be used. For example, an encoded form such as a one-dimensional code or a two-dimensional code may be used. Additionally, as long as it is possible for the user to transmit the access URL to the web browser 16, which is different from the web browser 12, it is not necessary to provide the notification by use of the notification screen 100 on the web browser 12. In this case, for example, the access URL sent to the client terminal 14 may be sent to the client terminal 18 by use of a short-range wireless communication technology, or the like.

Next, in a case where the access URL is input to the web browser 16 by the user, the web browser 16 sends the access URL to the browsing application 26 (S816). Thereafter, the browsing application 26 obtains the access ID from the received access URL (corresponding to S522 as described above). Then, by use of the obtained access ID, the authentication URL associated with the access ID is obtained from the database 30 (S820, which corresponds to S524 as described above).

Thereafter, the browsing application 26 sends the request for redirecting to the authentication URL to the web browser 16 (S822, which corresponds to S526). The web browser 16 sends an authentication request to the service application 28 in accordance with the received redirect request (S824). That is, in S824, the web browser 16 accesses the authentication URL. As a result, the service application 28 sends the authentication web page to the web browser 16, and the authentication web page is displayed on the web browser 16 (S826).

Next, in a case where the user inputs information for acquiring authentication for utilization of the service application 28 on the authentication web page, the web browser 16 sends the input information to the service application 28 (S828). Then, in a case where the authentication is successfully done in the service application 28, the service application 28 sends the callback after completion of authentication to the browsing application 26 (S830). The processing from S824 to S830 corresponds to the authentication processing in S528 described above.

In a case where the authentication is successfully done, the browsing application 26 can access the files managed by the service application 28. Then, the browsing application 26 sends a notification, which indicates that the authentication has been completed, to the web browser 12 (S832). As a method of providing the notification, which indicates that the authentication has been completed, from the browsing application 26 to the web browser 12, the notification is provided to the web browser 12, which has an ID for identifying the web browser to which the access URL has been sent in S814, for example. In addition, it is also possible that the web browser 12 periodically accesses the browsing application 26 from the timing where the access URL is notified to the web browser 12 in order to monitor the situation of processing by the web browser 16, so that the notification is provided based on the monitoring result. In this case, for example, the display on the web browser 12 may be switched according to the situation of processing, so as to notify the user of the situation of processing. Alternatively, for example, in the access in S802, the device ID of the client terminal 14 may be sent to the browsing application 26. Then, in S812, the browsing application 26 may store the device ID, the access ID, and the authentication URL in the database 30 in association with each other. Furthermore, in S832, the browsing application 26 may specify the client terminal 14, based on the device ID associated with the authentication URL or the access ID used for completed authentication. Then, the browsing application 26 may notify the specified client terminal 14 that the authentication has been completed.

Thereafter, in a case where the user makes a request for a file display screen, which is the web page for utilizing the file management service on the web browser 12, the web browser 12 sends a request for obtaining the file display screen to the browsing application 26 (S834). Based on the received request for obtaining the file display screen, the browsing application 26 sends a request for obtaining a file list associated with the authenticated account to the service application 28 (S836). Then, in response to this obtaining request, the service application 28 sends the file list to the browsing application 26 (S838). Based on the received file list, the browsing application 26 generates the file display screen 200 as the web page for utilizing the file management service, and the browsing application 26 sends the generated web page to the web browser 12 (S840). In this way, the web page for utilizing the file management service is displayed on the web browser 12. The processing from S834 to S840 corresponds to the processing of S506 as described above.

Note that, in a case where it is determined that the access from the client terminal 14 is authenticated in S806 in response to the check of the authentication state in S804, the processing from S808 to S834 is omitted, and the processing from S836 is executed. Furthermore, in a case where the service provided by the service application 28 is cloud printing as described above, a web page on which the files included in the above-described file list are displayed as printing candidates is sent in S840, for example. Then, after the processing illustrated in FIG. 8, a file selected by the user on the web page is sent from the service application 28 to the client terminal 14, which is a printer or an MFP. Thereafter, a document or an image included in the file is printed by the client terminal.

As explained above, in the browsing management system 10, in a case where the authentication web page that cannot be displayed on the web browser 12 is sent from the service server 22 to the relay server 20, the access ID is firstly issued in the relay server 20. Next, the relay server 20 manages the access ID and the authentication URL of the authentication web page in association with each other, and the relay server 20 generates the access URL, which includes the access ID and through which the web browser 16 can access the relay server 20, and sends the access URL to the web browser 12. Thereafter, in a case where the relay server 20 receives input of the authentication URL from the web browser 16, the relay server 20 obtains the access ID from the access URL and obtains the authentication URL from the access ID. Then, the relay server 20 sends the request for redirecting to the obtained authentication URL to the web browser 16, so that the authentication web page is displayed on the web browser 16. Thereafter, in a case where the authentication by use of the authentication web page is completed, the web page for utilizing the service is displayed on the web browser 12.

As a result, even in a case where a predetermined web page cannot be displayed on the web browser 12 from which the predetermined web page is accessed, due to the standard that the web browser complies with, the memory capacity of the client terminal, or the like, it is possible to browse the predetermined web page on the other web browser 16. Furthermore, in a case where a process by use of the predetermined web page is performed on the web browser 16, the web page for utilizing the service will be displayed on the web browser 12, so that the user can continue executing the provided service on the web browser 12.

Note that it is conceivable that, in such a case of continuing browsing web pages on the web browser 12, a specific web page cannot be displayed on the web browser 12 again. For example, it is conceivable that another web page provided by the service application 28, which is linked on the web page displayed by the process of S840 of FIG. 8, is not displayed. In this case, although the browsing application 26 may perform the alternative display processing by use of the web browser 16 again by the sequence explained in FIG. 8, it is also possible to use a method of displaying an error message on the web browser 12.

For example, it is assumed that, on the web browser 12, the file display screen 200 as illustrated in FIG. 7, which is the web page for utilizing the file management service, is displayed. Furthermore, it is assumed that, in a case where the user operates the client terminal 14 to select "IMAGE 1" and check the detailed information of IMAGE 1, the information cannot be obtained from the file management service. That is, it is assumed that a web page (the second web page) including the detailed information of IMAGE 1, which is provided by the service server 22, cannot be displayed by the web browser 12. In this case, as illustrated in FIG. 11A, the browsing application 26 displays a message, which represents that obtaining of the file has failed, on the web browser 12.

However, this message is displayed as a general-purpose message for an error caused by a temporary network failure or by the file management service, or for an error for unknown reasons, etc. However, in a case of an error whose cause is known and can be resolved by an operation by the user, it is desirable that a more detailed message be additionally displayed in addition to such a general-purpose message as in FIG. 11A. Here, it is assumed that the failure of obtaining the file as described above is because of the state of the user account in the file management service, and the error that has been occurring can be solved only if the user once logs in to the file management service. For example, such an error may occur in a case where the terms of utilizing the file management service have been revised, and the user's consent has become required again. In this case, the browsing application 26 additionally displays a message that prompts the user to log in to the file management service. However, since the web browser 12 may not be able to display the login screen of the file management service, a message that prompts to log in with another terminal is displayed, as illustrated in FIG. 11B. That is, a display that prompts access to the service server 22 from the web browser 16 is performed on the web browser 12.

Accordingly, for example, in a case where "IMAGE 1" on the file display screen 200 is selected again on the web browser 12 after logging in with the web browser 16 and performing a necessary operation such as re-consent to the terms of utilization, the detailed information of IMAGE 1 can be checked as desired by the user.

Furthermore, in the above-described example, the example in which a list of files is displayed on the web page for utilizing the file management service has been described, but the web page to be displayed is not limited as such. That is, for example, the service may be capable of issuing an instruction for printing or scanning in cooperation with such an MFP as described above which has printing and scanning functions. In this case, it is also possible that such a message as illustrated in FIG. 11B is displayed in a case where an error occurs at the time of issuing an instruction for printing or an instruction for uploading a scanned file to the logged-in service.

Other Embodiments

Note that the above-described embodiment may be modified as shown in the following (1) through (5).

(1) In the above-described embodiment, the web page for utilizing the file management service is displayed on the web browser 12 after the authentication is completed. However, the present invention is not limited as such. That is, after the authentication is completed, the web page for utilizing the file management service may be displayed on the web browser 16. Hereinafter, a detailed explanation is given with reference to FIG. 10. FIG. 10 is a sequence diagram of browsing processing in a case where the web page for utilizing the file management service is displayed on the web browser 16. Note that, in this case, up to the point where the service application 28 sends the callback after completion of authentication to the browsing application 26, that is, from S1002 to S1030, are the same as the contents explained from S802 to S830 described above, and, therefore, the explanation thereof is omitted.

In a case where the service application 28 sends the callback after completion of authentication in S1030, the browsing application 26 sends the request for obtaining the file list, which is associated with the authenticated account, to the service application 28 (S1032). Next, in response to this obtaining request, the service application 28 sends the file list to the browsing application 26 (S1034). Thereafter, based on the received file list, the browsing application 26 generates the file display screen 200 as the web page for utilizing the file management service, and the browsing application 26 sends the generated file display screen 200 to the web browser 16 (S1036).

In this case, even though the client terminal 14 operates on a specific OS that cannot display the web page sent from the browsing application 26, the user can utilize the service provided by the service application 28 by use of the client terminal 18.

(2) In the above-described embodiment, the browsing management system 10 includes the web browser 12, which is mounted on the client terminal 14, and the web browser 16, which is mounted on the client terminal 18. However, the present embodiment is not limited as such. That is, it is also possible that the browsing management system 10 includes only one client terminal and that the web browser 12 and the web browser 16 are mounted on that client terminal. Furthermore, the browsing management system 10 includes one web browser 12, which is not capable of displaying the authentication web page, and one web browser 16, which is capable of displaying the authentication web page. However, the present embodiment is not limited as such. That is, there may be multiple web browsers 12 and/or web browsers 16. Furthermore, in the above-described embodiment, the browsing management system 10 includes one service server 22. However, the present embodiment is not limited as such, and there may be multiple service servers 22. In this case, the service servers 22 provide different services, respectively, for example.

(3) Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Furthermore, in order to implement one or more functions of the above-described embodiment, for example, an OS, etc., running on a computer may perform a part or all of the actual processing, based on a program that has been read out. Alternatively, it is also possible that a program that has been read out is written into a memory mounted on a function extension board inserted into a computer, and then a CPU, or the like, mounted on the function extension board performs a part or all of the actual processing, based on instructions by that program. Note that, in this case, the function extension board may be a function extension unit connected to the computer.

(4) In the above-described embodiment, in order to determine whether or not to perform an alternative display on the web browser 16, the relay server 20 stores the list of version information of web browsers or types of client terminals that cannot display an authentication web page. However, the present embodiment is not limited as such. That is, it is also possible that a web page that cannot be displayed on the web browser 12 is registered from the client terminal 14 or 18 to the relay server 20, so that the determination portion 70 makes the determination, based on the information of the registered web page.

(5) The above-described embodiment and various forms shown in (1) through (4) may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-114447, filed Jun. 20, 2019, which is hereby incorporated by reference wherein in its entirety.

What is claimed is:

1. A browsing management server comprising:
at least one memory that stores instructions; and
at least one processor that executes the instructions to:
receive, from a first web browser of a predetermined apparatus, an access request for accessing a service server;
determine whether a predetermined web page can be displayed on the first web browser or not;
manage an ID and a URL of the predetermined web page associated with each other if it is determined that the predetermined web page cannot be displayed on the first web browser;
perform first control to cause the first web browser to display access information including the managed ID and a message for prompting an access request using the access information by a second apparatus which is different from the predetermined apparatus and which has a second web browser, on the first web browser;
receive an access request from the second web browser of the second apparatus, the access request being made by use of the access information;
perform second control to cause the second web browser of the second apparatus to display the predetermined web page, based on the URL associated with the managed ID which is included in the access information used for the received access request, and
perform third control to cause the first web browser of the predetermined apparatus to display a first web page for utilizing a service provided by the service server in response to completion of predetermined processing which is performed based on the predetermined web page displayed on the second web browser by the second control.

2. The browsing management server according to claim 1, wherein, in a case where the predetermined web page is accessed from the second web browser and the predetermined processing is completed, the at least one processor generates the first web page and performs the third control to cause the first web browser to display the generated first web page.

3. The browsing management server according to claim 1, wherein the access information is information for identifying a domain of the browsing management server and the ID that follows the domain, and the access information is sent to the first web browser in a URL format that can be confirmed by the user.

4. The browsing management server according to claim 1, wherein the access information is information for identifying a domain of the browsing management server and the ID that follows the domain, and the access information is sent to the first web browser in a format of a one-dimensional code or a two-dimensional code.

5. The browsing management server according to claim 1, wherein the ID has a valid period.

6. The browsing management server according to claim 1, wherein the ID is a one-time ID.

7. The browsing management server according to claim 1, wherein
the determination is performed based on version information of the first web browser or information of a web page that is registered in advance, and
wherein the ID is issued in a case where it is determined in the determination that the predetermined web page cannot be displayed on the first web browser.

8. The browsing management server according to claim 1, wherein the other apparatus mounted with the second web browser has a memory with a larger capacity, compared to the predetermined apparatus mounted with the first web browser.

9. The browsing management server according to claim 1, wherein
the determination is performed based on version information of the first web browser, information of the predetermined web page that is registered in advance, or the type of the predetermined apparatus mounted with the first web browser, and
wherein the ID is issued in a case where it is determined in the determination that the predetermined web page cannot be displayed on the first web browser.

10. The browsing management server according to claim 1,
wherein the at least one processor executes the instructions to perform the second control to cause the second web browser to display the predetermined web page by notifying the second web browser of the URL associated with the manage ID which is included in the access information.

11. The browsing management server according to claim 1, wherein the predetermined processing is authentication processing, and
in response to completion of the authentication processing, the at least one processor performs the third control to cause the first web browser to display the first web page on the first web browser.

12. The browsing management server according to claim 10, wherein the predetermined apparatus is a printing apparatus.

13. A browsing management method for managing comprising:
    receiving, from a first web browser of a predetermined apparatus, an access request for accessing a service server;
    determining whether a predetermined web page can be displayed on the first web browser or not;
    managing an ID and a URL of the predetermined web page associated with each other if it is determined that the predetermined web page cannot be displayed on the first web browser;
    performing first control to cause the first web browser to display access information including the managed ID and a message for prompting an access request using the access information by a second apparatus which is different from the predetermined apparatus and which has a second web browser, on the first web browser;
    receiving an access request from the second web browser of the second apparatus, the access request being made by use of the access information;
    performing second control to cause the second web browser of the second apparatus to display the predetermined web page, based on the URL associated with the managed ID which is included in the access information used for the received access request, and
    performing third control to cause the first web browser of the predetermined apparatus to display a first web page for utilizing a service provided by the service server in response to completion of predetermined processing which is performed based on the predetermined web page displayed on the second web browser by the second control.

14. A browsing management system including a predetermined apparatus provided with a first web browser and a browsing management server for managing browsing of a web page by a user in accordance with an access from the first web browser,
    the browsing management server comprising:
    at least one memory that stores instructions; and
    at least one processor that executes the instructions to:
        receive, from a first web browser of a predetermined apparatus, an access request for accessing a service server;
        determine whether a predetermined web page can be displayed on the first web browser or not;
        manage an ID and a URL of the predetermined web page associated with each other if it is determined that the predetermined web page cannot be displayed on the first web browser;
        perform first control to cause the first web browser to display access information including the managed ID and a message for prompting an access request using the access information by a second apparatus which is different from the predetermined apparatus and which has a second web browser, on the first web browser;
        receive an access request from the second web browser of the second apparatus, the access request being made by use of the access information;
        perform second control to cause the second web browser of the second apparatus to display the predetermined web page, based on the URL associated with the managed ID which is included in the access information used for the received access request,
    the predetermined apparatus comprising a memory storing instructions and at least one processor that executes the instructions to:
        display a first web page for utilizing a service provided by the service server in response to completion of predetermined processing which is performed based on the predetermined web page displayed on the second web browser by the second control.

15. The browsing management system according to claim 14,
    wherein the first web browser periodically accesses the browsing management server, so that the receiving unit receives the predetermined notification.

16. The browsing management system according to claim 14,
    wherein the access information is information for identifying a domain of the browsing management server and the ID that follows the domain, and the access information is sent to the first web browser in a URL format that can be confirmed by the user.

17. The browsing management system according to claim 14,
    wherein the access information is information for identifying a domain of the browsing management server and the ID that follows the domain, and the access information is sent to the first web browser in a format of a one-dimensional code or a two-dimensional code.

18. The browsing management system according to claim 14,
    wherein the ID has a valid period.

19. The browsing management system according to claim 14,
    wherein the predetermined apparatus is a printing apparatus.

* * * * *